(12) United States Patent
Hoya et al.

(10) Patent No.: US 6,565,259 B2
(45) Date of Patent: May 20, 2003

(54) ROLLING BEARING WITH REINFORCING MEMBER

(75) Inventors: Shigenori Hoya, Kitasaku-gun (JP); Sumio Sato, Kitasaku-gun (JP)

(73) Assignee: Minebea Co., Ltd., Miyota-machi (JP)

( * ) Notice: Subject to any disclaimer, the term of this patent is extended or adjusted under 35 U.S.C. 154(b) by 0 days.

(21) Appl. No.: 10/002,124

(22) Filed: Dec. 5, 2001

(65) Prior Publication Data

US 2002/0081048 A1 Jun. 27, 2002

(30) Foreign Application Priority Data

Dec. 27, 2000  (JP) ........................................ 2000-398524

(51) Int. Cl.⁷ .............................................. F16C 33/49
(52) U.S. Cl. .................... 384/527; 384/523; 384/531
(58) Field of Search ................................ 384/527, 531, 384/532, 523, 526

(56) References Cited

U.S. PATENT DOCUMENTS 5,387,041 A  *  2/1995  Lederman .................... 384/531
6,352,371 B1 *  3/2002  Goto et al. ................... 384/523

* cited by examiner

*Primary Examiner*—Lenard A. Footland
(74) *Attorney, Agent, or Firm*—Oliff & Berridge, PLC

(57) ABSTRACT

The present invention provides a rolling bearing that prevents retainer noise and NRRO deterioration thereof by imparting strength and rigidity to a retainer so as to prevent it from being deformed by force from rolling elements and sliding friction. An annular plate is connected to a retainer by bosses. Due to the rigidity of the annular plate, the strength and rigidity of the retainer can be improved. Additionally, since the bosses are fixed to grease reservoirs arranged at an equal spacing therebetween on the circumference of the retainer, the strength and rigidity of the retainer can be equally improved over the entire circumference thereof.

5 Claims, 3 Drawing Sheets

ROLLING BEARING WITH REINFORCING MEMBER

BACKGROUND OF THE INVENTION

1. Field of the Invention

The present invention relates to a rolling bearing, and particularly, to a rolling bearing which is suitable for rotational support members of hard disk drives (HDD), video tape recorders, office automation equipment and so forth.

2. Description of the Related Art

As shown in FIG. 4, a rolling bearing 10 consists of an inner ring 11 and an outer ring 12 each having a raceway surface, and a plurality of rolling elements 5 such as balls. Each rolling element 5 is rollably arranged between the raceway surface of the inner ring 11 and the raceway surface of the outer ring 12. Additionally, a retainer 1 rotatably holds each rolling element 5 and ring-shaped sealing members 13 are arranged at each end in the axial direction.

The retainer 1, as shown in FIG. 5, is a ring body having a plurality of ball pockets 2 arranged at equal spacing therebetween, and is resin molding which is molded in one piece. The ball pockets 2 are parts for holding the rolling elements 5 (see FIG. 4). A pair of claws 3 provided at each ball pocket 2 prevents the rolling elements 5 from falling out, and can rotatably hold the elements. Grease resevoirs 4 are arranged at equal spacing between the claws 3 adjacent ball pockets 2. The individual rolling elements 5 are arranged at equal spacing therebetween by the retainer 1, thereby preventing seizure caused by the mutual contact of the rolling elements 5.

Since the retainer 1 does not directly support a bearing load, the retainer may be made of a material having a lower strength than the rolling elements 5, the inner ring 11 and the outer ring 12. However, the retainer 1 is in sliding contact with the rolling elements 5, the inner ring 11 and the outer ring 12. For instance, while the inner ring 11 is rotating and the outer ring 12 is stopped during use, the rolling elements 5 rotate and revolve around the inner ring 11. The retainer 1 is driven by the rolling elements 5 while the ball pockets 2 and the rolling elements 5 are in sliding contact with each other, and the retainer 1 rotates around the inner ring 11 at the same speed as the revolving speed of the rolling elements 5. Thus, the retainer 1 has to resist abrasion and seizure, and is often made of a synthetic resin such as nylon 66 by injection molding.

The retainer 1 molded from such a material can be elastically deformed. Thus, after the resin is injected into a die and solidified during injection molding, a product is released from the die by so-called forced pull-out wherein the claws 3, having an undercut shape in the releasing direction, are widened outwardly, thus simplifying the structure of the die. Moreover, during the assembly of the rolling bearing 10, the tips of the claws 3 of the retainer 1 are pushed outward and the rolling elements 5 are pushed into the ball pockets 2. Thus the rolling elements 5 can be held rollably.

The claws 3 of the retainer 1 are made thin in consideration of the releasing property from the die and the assembling property of the rolling elements 5 described above, which has the following influence on the characteristics of the rolling bearing 10.

A clearance is provided at a required distance between the retainer 1 and the rolling elements 5 or bearing rings of the inner ring 11 and the outer ring 12. However the retainer 1 vibrates despite the clearance being filled and supplied with grease. In addition, noise, the so-called retainer noise, and vibration are generated. Specific causes for the retainer noise are such as:

(1) collision between the retainer 1 and the rolling elements 5 or bearing rings of the inner ring 11 and the outer ring 12, (2) self-excited vibration due to sliding friction between the rolling elements 5 and the retainer 1, (3) collision between the retainer 1 and the rolling elements 5 due to grease resistance, (4) vibration due to waviness of the raceway rings surface of the inner ring 11 and the outer ring 12, and rolling contact surfaces of the rolling elements 5, and (5) vibration frequency of the shaft portion is close to the resonance frequency of the retainer 1.

In addition, run-out is found in revolution frequencies of the rolling elements 5 due to mutual differences in diameter of the rolling elements 5 and disproportionate arrangement of the rolling elements 5 in a circumferential direction. Accordingly, the vibration fluctuates during the rotation of the rolling bearing 10, and non-repetitive run-out (NRRO) intensifies. Thus, infinitesimal displacement occurs, which results in uneven rotation of HDD and so forth and to deterioration of performance by characteristics such as NRRO. Particularly, when the rolling bearing is used at high rotation (12,000 to 15,000 rpm), a force from the rolling elements 5 works on a thin part of the retainer 1, thus deforming the retainer. In addition, the claws 3 are expanded, increasing the moving area of the rolling elements 5 and thereby intensifying collision noise. The rolling elements 5 are also greatly shifted, which results in the disproportionate arrangement of the rolling elements in the circumferential direction and the deterioration of the NRRO.

SUMMARY OF THE INVENTION

Accordingly, it is an object of the present invention to impart strength and rigidity to a retainer to prevent if from deformation by force coming from the rolling elements and sliding friction without deteriorating its releasing property from a die and assembling property of the rolling elements, thus preventing retainer noise and NRRO deterioration of a rolling bearing.

In order to solve the above problems, a rolling bearing according to a first aspect of the invention comprises a resinous retainer having a pair of claws at each of a plurality of ball pockets arranged at equal spacing therebetween so as to prevent rolling elements from falling out, and a separate reinforcing member fixed to the retainer. In other words, since the separate reinforcing member is fixed to the retainer in the present invention, strength and rigidity of the retainer is improved.

Moreover, the reinforcing member may have an annular plate and a plurality of bosses fixed to grease resevoirs of the retainer. According to the present invention, the bosses connect the annular plate to the retainer, and the strength and rigidity of the retainer can be improved due to the rigidity of the annular plate. The grease reservoirs are preferably arranged at an equal spacing therebetween on the circumference of the retainer, so that the strength and rigidity of the retainer can be equally improved over the entire circumference by connecting the bosses to the retainer at the grease reservoirs.

The annular plate may have openings so as not to touch the rolling elements. In this configuration, the annular plate and the rolling elements are by no means in contact with each other even when the retainer is set closer to the annular plate. Thus, a space for setting the reinforcing member can be reduced as much as possible, and the bosses can be shortened as much as possible, thereby preferably improving the rigidity and strength of the retainer.

Furthermore, the grease resevoirs of the retainer can be provided with holes to which the bosses of the reinforcing member are press-fit. In this configuration, the reinforcing member can be fixed to the retainer more simply.

DESCRIPTION OF THE PREFERRED EMBODIMENT

Figure 1:
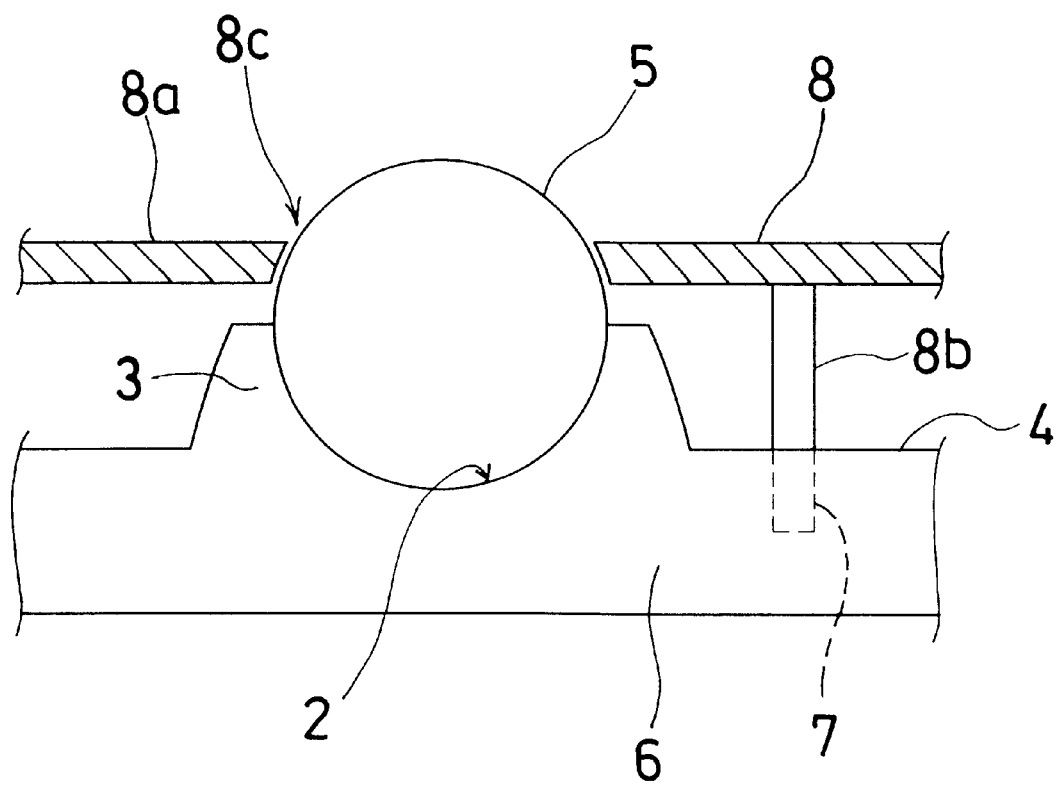
FIG. 1 is a side view of a rolling element and a retainer, and a sectional view of a reinforcing member of a rolling bearing according to an embodiment of the present invention.

A preferred embodiment of the present invention will be explained along with the attached drawings. The same reference numerals are used for the same or equivalent parts as those of a conventional art, and the detailed explanation thereof is omitted herein.

Figure 2:
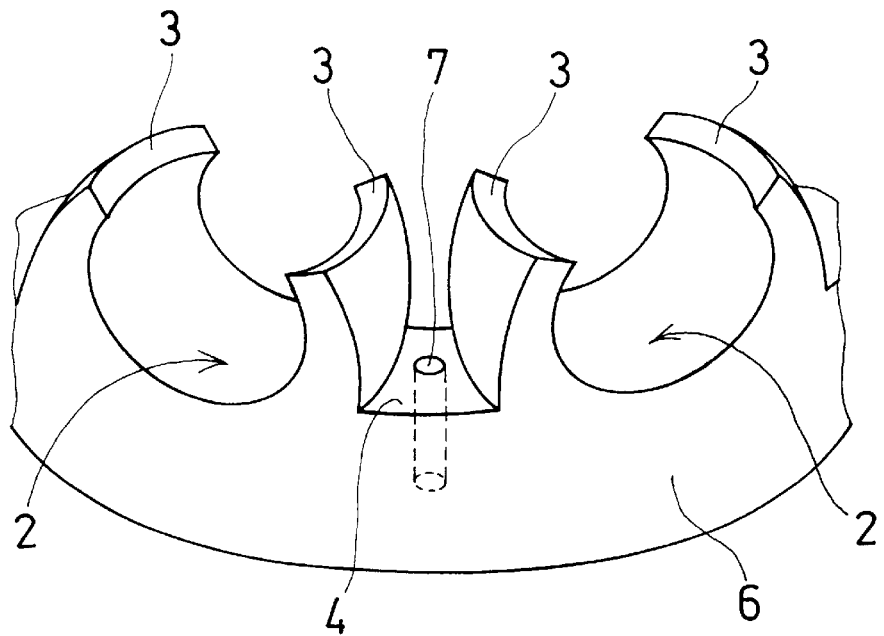
FIG. 2 is a perspective view of the retainer shown in FIG. 1.
Figure 3:
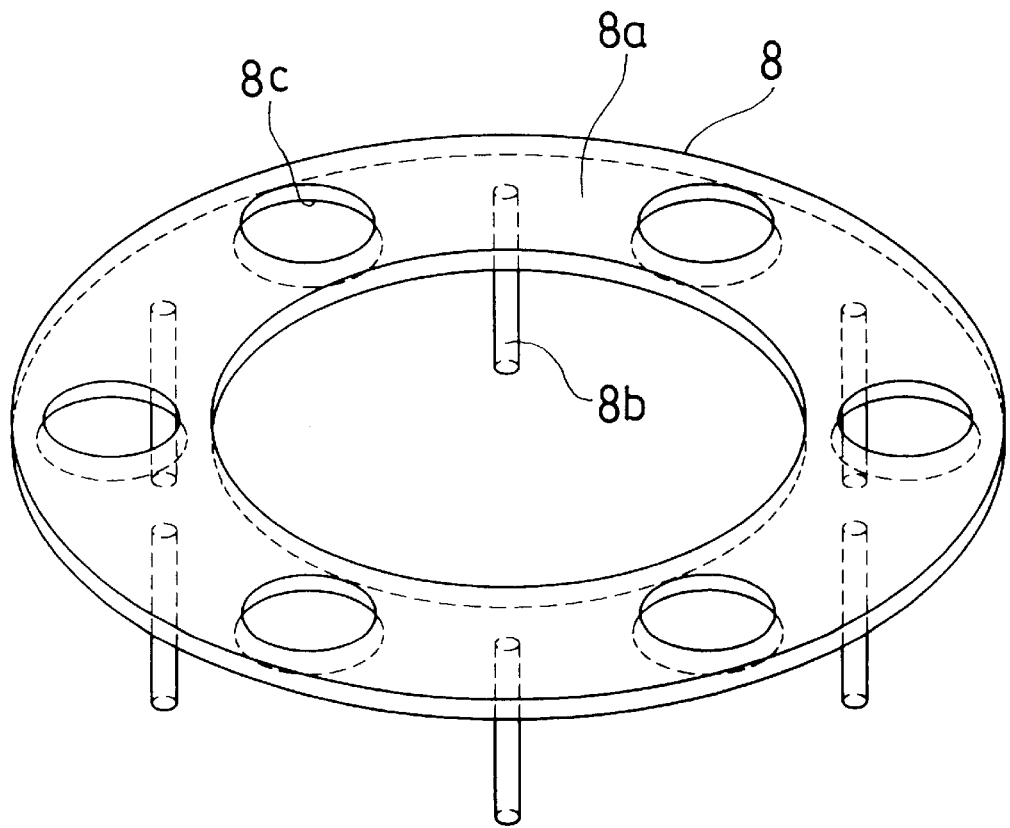
FIG. 3 is a perspective view of the reinforcing member shown in FIG. 1.

FIG. 1 shows a rolling element 5, a retainer 6 and a separate reinforcing member 8 which is fixed to the retainer 6, of a rolling bearing according to an embodiment of the invention seen from the side (cross section for the reinforcing member 8). FIG. 2 is a partial view of the retainer 6. FIG. 3 is a overall view of the reinforcing member 8.

Figure 5:
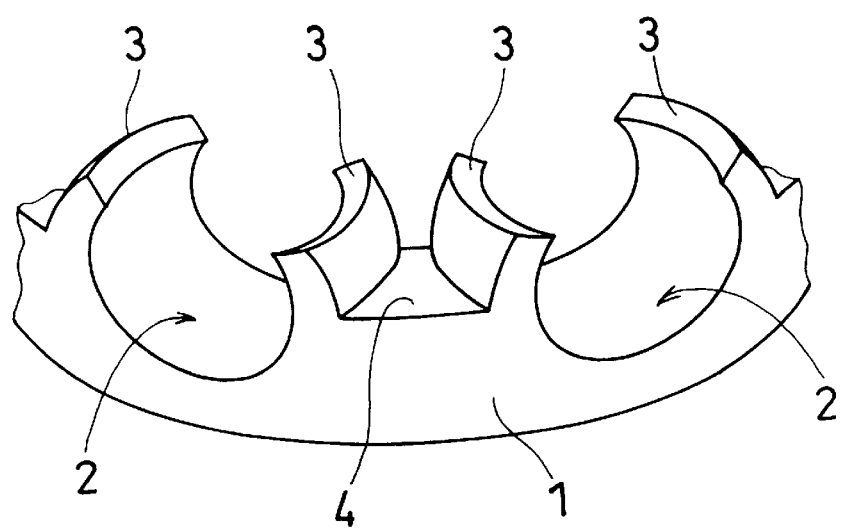
FIG. 5 is a perspective view of a retainer of the rolling bearing shown in FIG. 4.

The retainer 6 has nearly the same configuration as the conventional retainer 1 (see FIG. 5), but is different from the conventional retainer 1 since grease reservoirs 4 are provided with holes 7. The depth of the holes 7 is 30% to 70% of a thickness of the grease reservoirs 4 on the retainer 6. The rest is the same as that of the conventional retainer 1 in that the retainer 6 is made of a synthetic resin such as nylon 66 by injection molding.

The reinforcing member 8 is provided with a plurality of bosses 8b, and openings 8c to keep the reinforcing member 8 away from the rolling elements 5, at an annular plate 8a. The outside diameter of the annular plate 8a is 80% to 120% of the outside diameter of the retainer 6. The thickness of the annular plate 8a is 20% to 80% of the thickness of the grease reservoirs 4 on the retainer 6. Moreover, the openings 8c have spherical inner surfaces corresponding to the rolling elements 5, and the diameter from a center point is 100% to 120% of the diameter of the rolling elements 5. Furthermore, the length of the bosses 8b is 20% to 60% of the width of the retainer 6 (difference between an inside diameter and an outside diameter). It is preferable that the reinforcing member 8 is made of nylon 66 like the retainer 6, or a synthetic resin such as a resin in which glass fiber is mixed into nylon 66 up to 30%, polyacetal, liquid crystal polymer or the like, and is manufactured by injection molding.

The reinforcing member 8 is fixed to the retainer 6 after the tips of the claws 3 of the retainer 6 are pushed out and the rolling elements 5 are pushed into ball pockets 2. The bosses 8b are welded to the holes 7 provided at the grease reservoirs 4 on the retainer 6, by press-fit or ultrasonic, so that the reinforcing member 8 is fixed to the retainer 6 more simply. The bosses 8b protrude from the surface of the retainer 6 by only 50% to 100% of the diameter of the rolling members 5, in a press-fit condition to the holes 7 of the retainer 6. Additionally, although not shown in the drawings, the bosses 8b may be so-called stepped bosses, so that the reinforcing member 8 can be positioned to the retainer 6 with greater accuracy and certainty.

Moreover, each rolling element 5 held rollably by the retainer 6 is positioned with a constant gap in relation to the openings 8c of the annular plate 8a while the reinforcing member 8 is fixed to the retainer 6. The rolling elements 5 are by no means directly in contact with the annular plate 8a.

Figure 4:
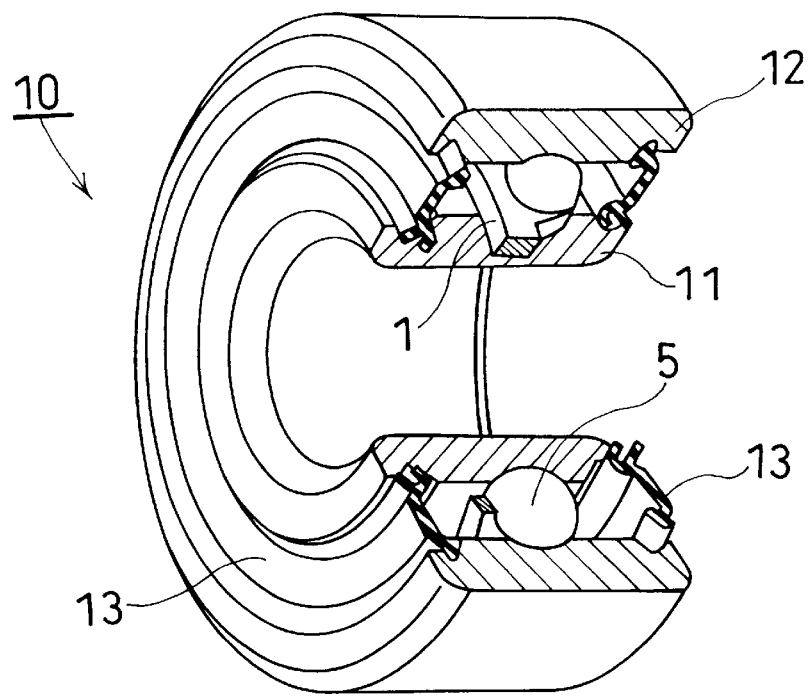
FIG. 4 is a perspective view in section, showing a conventional rolling bearing.

FIG. 3 shows the reinforcing member 8 having six bosses 8b and six openings 8c. This reinforcing member 8 is used for the retainer 6 having six ball pockets 2 and six grease reservoirs 4. Accordingly, it is obvious that the number of bosses 8b and openings 8c of the reinforcing member 8 is not limited to that shown in the drawings. Moreover, since an inner ring, an outer ring and ring-form seal members of the rolling bearing according to the preferred embodiment of the present invention have the same configurations as those of the conventional rolling bearing 10 (see FIG. 4), the detailed explanation thereof is omitted.

The above-mentioned embodiment of the present invention can exert the following effects. First, the bosses 8b connect the annular plate 8a to the retainer 6, so that the strength and rigidity of the retainer 6 can be improved due to the rigidity of the annular plate 8a. Additionally, the bosses 8b are fixed to the grease reservoirs 4 arranged at equal spacing therebetween on the circumference of the retainer 6, so that the strength and rigidity of the retainer 6 can be equally improved over the entire circumference.

Moreover, since the openings 8c are formed on the annular plate 8a, each rolling element 5 held rollably by the retainer 6 is by no means directly in contact with the annular plate 8a even when the retainer 6 is set closer to the annular plate 8a. Thus, a space for setting the reinforcing member 8 can be reduced as much as possible, so that the retainer 6 may be simply substituted for the conventional retainer 1 (FIG. 4 and FIG. 5) for use. Additionally, the bosses 8b can be shortened as much as possible in order to improve rigidity and strength when the reinforcing member 8 is fixed to the retainer 6.

Furthermore, the bosses 8b are press-fit and then welded to the holes 7 provided at the grease reservoirs 4 on the retainer 6. Accordingly, the reinforcing member 8 can be fixed to the retainer 6 more simply, and the increase in manufacturing costs can be prevented as much as possible. When the reinforcing member 8 is made of the same material as the retainer 6, the welding operation can be carried out much easier.

Being configured as mentioned above, the present invention has the following effects. First, according to the first aspect of the present invention, strength and rigidity can be imparted to the retainer so as to prevent it from being deformed by force from the rolling elements and sliding friction, without reducing its releasing property from a die and assembling property of the rolling elements. Accordingly, retainer noise and NRRO deterioration of the rolling bearing can be prevented.

Moreover, the strength and rigidity of the retainer can be improved due to the rigidity of an annular plate. Additionally, the strength and rigidity of the retainer can be equally improved over the entire circumference thereof.

The rigidity and strength of the retainer can be improved, so that the retainer noise and NRRO deterioration of the rolling bearing can be prevented.

Furthermore, a reinforcing member can be fixed to the retainer more simply, thereby preventing increases in manufacturing costs.

What is claimed is:

1. A rolling bearing comprising:

a resinous retainer having a pair of claws at each of a plurality of ball pockets arranged with a equal spacing therebetween so as to prevent rolling elements from falling out; and a separate reinforcing member fixed to the retainer.

2. A rolling bearing according to claim 1, wherein the reinforcing member comprises an annular plate, and a plurality of bosses which are fixed to grease reservoirs of the retainer.

3. A rolling bearing according to claim 2, wherein the annular plate is provided with openings so as not to contact the rolling elements.

4. A rolling bearing according to claim 3, wherein the grease reservoirs of the retainer are provided with holes to which the bosses of the reinforcing member are press-fit.

5. A rolling bearing according to claim 2, wherein the grease reservoirs of the retainer are provided with holes to which the bosses of the reinforcing member are press-fit.

* * * * *